CODE MODULATION PULSE TRANSMITTER

Filed April 14, 1951

INVENTORS.
JOHANNES ANTON GREEFKES
FRANK DE JAGER
PIET VAN TILBURG
BY
Fred M Vogel
AGENT.

Patented Aug. 21, 1956

United States Patent Office 2,760,003

2,760,003

PULSE-CODE MODULATION TRANSMITTER

Johannes Anton Greefkes, Frank De Jager, and Piet Van Tilburg, Eindhoven, Netherlands, assignors to Hartford National Bank and Trust Company, Hartford, Conn., as trustee Application April 14, 1951, Serial No. 221,021

Claims priority, application Netherlands May 17, 1950

5 Claims. (Cl. 179—15)

Figure 2:
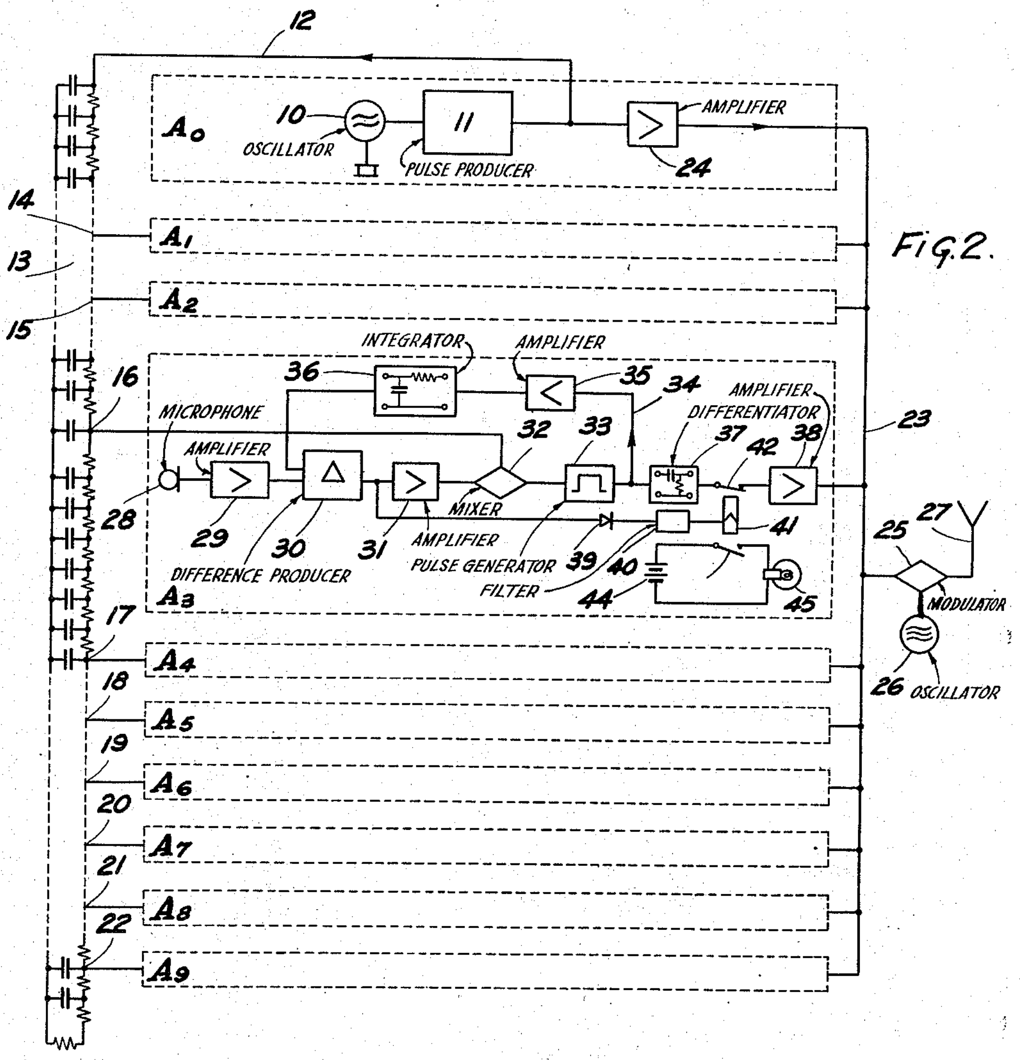

This invention relates to transmitters for transmission of signals by pulse-code modulation, in which synchronisation pulses are transmitted and each signal cycle comprises a synchronisation interval and a plurality of signal intervals occurring in cyclic sequence and within which signal pulses are present or absent as a function of the signals to be transmitted, all pulses transmitted being substantially equal and coinciding with different pulses of a series of equidistant pulses.

The combined use of quantisation in time and amplitude is characteristic of pulse-code modulation.

The use of time quantisation implies that the pulse-code modulator yields only pulses which coincide with pulses of a series of equidistant pulses. Thus, at the receiving end, transmission errors introduced by time shifts of the incoming pulses may substantially be eliminated by the use of pulse regenerators which, if desired, may be preceded by amplitude-threshold and amplitude-limiting devices. This is a particular advantage more particularly in the case of transmission of signals by way of a plurality of relay transmitters, which advantage does not occur in other kinds of pulse modulation such, for example, as pulse-position modulation. Furthermore, the time quantisation may be utilized to minimize cross-talk between different channels in the transmission of a plurality of signals with the use of time-multiplex.

In other conventional methods of modulation it is possible to transmit any instantaneous value of a signal comprised between determined limits whereas when use is made of amplitude quantisation, a limited number only of amplitude levels can be transmitted. Thus radio transmitters are known for the transmission of intelligence signals in channels by pulse-code modulation with the use of, for example, a binary 5-units code, in which event 32 different amplitude levels can be transmitted. The transmitted signal is in this case sampled at a repetition frequency (signal-cycle frequency) which is about twice the maximum signal frequency to be transmitted and which is, for example, 8 kcs./sec. at a maximum signal frequency of 3.4 kcs./sec. Instead of transmitting the instantaneous values of the signal occuring at the moments of sampling, the most adjacent amplitude level of the 32 amplitude level which can be transmitted is transmitted in a particular manner, since if the level to be transmitted is coded in a code-pulse group modulator, that is to say when use is made of a five-units code, a code-pulse group is generated and transmitted which characterises said level and which comprises at the most 5 relatively equal and equidistant pulses. Each of the signal pulses thus occurs within a signal interval individually associated with it. The presence or the absence of one or more pulses of a code-pulse group characterises the amplitude level and thus gives approximately the instantaneous value of the signal.

In order to ensure synchronism of a receiver co-operating with such a transmitter, it is known to transmit a synchronisation pulse during each second signal cycle and to suppress this pulse in intermediate signal cycles, in such manner that all transmitted pulses are substantially equal and coincide with different pulses of a series of equidistant pulses. Each signal cycle in this case comprises a single synchronisation interval and a plurality of signal intervals occurring in cyclic sequence. Each signal cycle comprises a number of signal pulse intervals equal to the maximum number of the signal pulses to be transmitted during each signal cycle, that is to say 5 signal pulse intervals in the transmission of a single intelligence signal with the use of a 5-units code, $5n$ signal pulse intervals in the simultaneous transmission of $n$ intelligence signals in time-multiplex, each with the use of a 5-units code etc.

At a cycle frequency of, for example, 5 kcs./sec. the repetition frequency of the transmitted synchronisation pulses may be 4 kcs./sec. and this has been found to be serviceable in practice, this frequency, as a rule, being represented only weakly in corresponding signal intervals. At the receiving end, the synchronisation intervals may be identified and thus found due to the said 4 kcs./sec. component which occurs strongly and which, after the synchronisation interval at the receiving end has been found, is used to control the receiver synchronisation. However, the said 4 kcs./sec. component does not always constitute in practice a sufficiently reliable identification of the synchronisation intervals with respect to the signal intervals.

In addition to the above-mentioned kind of transmitters for pulse-code modulation, transmitters comprising pulse-code modulators have previously been suggested which are based on similar principles and in which the signals to be transmitted control a pulse modulator connected to a generator for equidistant pulses, a return circuit with a pulse-code demodulator, bridging the pulse modulator, the return circuit comprising the series combination of a network integrating the signal frequencies and a difference producer, also controlled by the signals to be transmitted. At the difference producer, a return voltage is set up constituting a quantised approximation of the signal to be transmitted and which varies in time about the input signal. A positive or a negative differential voltage occurs across the output circuit of the difference producer, according as the instantaneous value of the return voltage is greater or less than the instantaneous value of the signal to be transmitted. Under control of the polarity of the said difference voltage or a voltage derived therefrom, the pulses provided by the pulse generator are either transmitted by the pulse modulator to the output circuit of the pulse-code modulator or suppressed. (See the copending U. S. patent application, Serial No. 75,664, filed February 10, 1949.) In this simultaneous transmission of a plurality of signals in a time-multiplex system, a synchronisation pulse may, as before, be transmitted during each second signal cycle in order to provide synchronism of the receiver.

As an alternative, the said pulse-code modulators comprising a return circuit may be realised in such manner (see the copending U. S. patent application, Serial, No. 75,663, filed February 10, 1949) that the quantised instantaneous value of the difference voltage or a voltage derived therefrom (see the copending U. S. patent application, Serial No. 216,486, filed March 20, 1951) is indicated by means of a pulse-group code, preferably of the binary type. When using the lastmentioned pulse-code modulators comprising a return circuit, synchronisation pulses require to be transmitted not only in the time-multiplex transmission, but also in the transmission of a single intelligence signal.

With pulse-code modulators comprising a return circuit, the said methods of transmitting synchronisation pulses may likewise lead to practical disadvantages. For example, in the case of pulse-code modulators comprising a return circuit which are intended for the transmission of signals by means of a one-unit code, in the absence of an intelligence signal and hence, for example, during an intelligence interval, the half signal-cycle frequency may be strongly represented in the series of pulses transmitted during corresponding signal intervals. The receiver synchronisation could then respond as if this speech channel were the synchronisation channel.

The object of the invention is to provide an improved transmitter for the transmission of signals by pulse-code modulation.

According to the invention, a transmitter for the transmission of signals by pulse code modulation, in which synchronisation pulses are transmitted and each signal cycle comprises a synchronisation interval and a plurality of signal intervals occurring in cyclic sequence and within which signal pulses may be present or absent as a function of the signals to be transmitted, all transmitted pulses being substantially equal and coinciding with different pulses of a series of equidistant pulses, is characterised in that due to the transmission of a synchronisation pulse during the synchronisation interval of each signal cycle, the repetition frequency of the synchronisation pulses is equal to the signal-cycle frequency.

The continuous occurrence of signal pulses within a predetermined signal interval when using the transmitter according to the invention, in regard to the synchronisation pulses in the synchronisation interval, represents an operating condition of the transmitter for pulse-code modulation which is to be regarded as abnormal. This allows inter alia rapid finding of the synchronisation interval at the receiving end.

If the said abnormal operating condition occurs, the signal channel concerned may automatically be made inoperative by means of a test relay, which, when energised, cuts off the signal-pulse outlet of the speech channel concerned and, for example, actuates simultaneously an alarm device. It is thus prevented that a signal channel may take over the function of the synchronisation channel.

Finding the synchronisation intervals at the receiving end when using the invention, as well as maintaining synchronism of the receiver, may be effected in a manner known per se or, for example, in a manner as explained in the copending U. S. patent application, Serial No. 221,022, filed April 14, 1951, which deals with similar subject matter.

Figure 1:
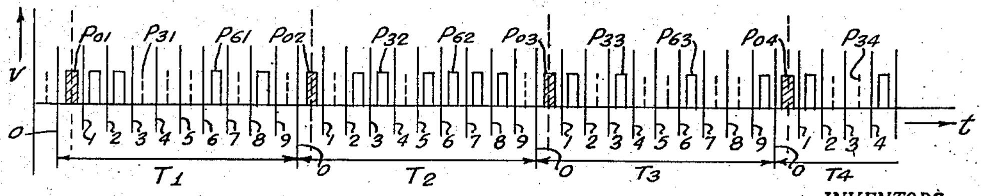

In order that the invention may be more clearly understood and readily carried into effect, it will now be described more fully with reference to the accompanying diagrammatic drawing, given by way of example, in which:

Fig. 1 shows a time-diagram of pulses transmitted by a 9+1 channels time-multiplex transmitter according to the invention, in the transmission of signals with the use of a 1-unit code, and Fig. 2 is a block diagram of one embodiment of a transmitter adapted to be used for this purpose.

In the voltage time (V, $t$) diagram shown in Fig. 1, $T_1$, $T_2$, $T_3$, $T_4$ indicate sequential signal cycles, each of which is subdivided into 10 equal intervals. The first interval is indicated by 0 and intended for synchronisation pulses $P_{01}$, $P_{02}$, $P_{03}$, $P_{04}$, etc., the pulses being indicated by shaded rectangles. The other intervals in each signal cycle are numbered continuously from 1 to 9, inclusive, and are intended for pulses associated with nine different signal channels: Thus $P_{31}$, $P_{32}$, $P_{33}$, $P_{34}$ indicate four pulses associated with the third signal channel. It is to be noted that the pulses $P_{31}$ and $P_{34}$ are suppressed and consequently indicated only by dotted lines. Pulses $P_{61}$, $P_{62}$, $P_{63}$, none of which are suppressed, associated with the sixth signal channel are indicated in a similar manner.

There is no difference between the signal and synchonisation pulses as regards their shape, duration and amplitude. The synchronisation pulses are identifiable on account of their continuous presence, that is to say each signal cycle comprises a synchronisation pulse in the time interval indicated by 0. Pulses associated with a predetermined signal channel, for example the pulses $P_{31}$ to $P_{34}$ or $P_{61}$ to $P_{63}$ associated with the third or sixth signal channel are present or absent as a function of the signal to be transmitted in the channel concerned. The substantially continuous presence of the signal pulse in the signal interval associated with one of the signal channels constitutes an abnormal operating condition, in which event the signal channel concerned required to be made inoperative, for example a pulse has been present in 25,000 consecutive signal cycles, this in order to prevent the signal channel from taking over the function of the synchronisation channel (time interval 0).

In the series of pulses shown in Fig. 1, all transmitted pulses coincide in time position with respective pulses in a series of equidistant pulses. The repetition frequency of the synchronisation pulses, together with the signal-cycle frequency, may be, for example, 50 kcs./sec. and the duration of the transmitted pulses may be 1 microsec.

Fig. 2 shows a block diagram of a multiplex transmitter in which the transmitted pulses have the character shown in Fig. 1. This transmitter comprises a single synchronisation channel $A_0$ and nine signal channels $A_1$ to $A_9$ inclusive. Of the signal channels $A_1$ to $A_9$ only the block diagram of $A_3$ is shown in any detail. The other signal channels are exactly similar and not shown for the sake of simplicity.

The synchronisation channel $A_0$ comprises a crystal-controlled oscillator 10 and a pulse producer 11 connected thereto which supplies pulses of 1 microsec. at a repetition frequency of 50 kcs./sec. Said pulses are supplied to a pulse amplifier 24 and also through conductor 12 to a delay line 13, constituted by a large number of resistor-capacitor sections. The signal channels are connected in numerical sequence to tapping points 14 to 22 of delay line 13 in such manner that a pulse is supplied to each of the various signal channels during the time-intervals individually associated with them, said pulses being allowed to pass or being suppressed in the signal channels as a function of the signals to be transmitted in the various channels. The outlets of the signal channels are connected in parallel by means of a conductor 23, to which the output circuit of the pulse amplifier 24 included in the synchronisation channel $A_0$ is also connected. The pulses derived from the various channels occur in succession as shown in Fig. 1 and are supplied to the further transmitting equipment comprisng, for example, a modulator 25, a carrier-wave oscillator 26 and an aerial 27.

Referring now to the block diagram of signal channel $A_3$, the signals to be transmitted in this channel are derived from a microphone 28 and supplied, by way of a low-frequency amplifier 29, to a difference producer 30, the output voltage of which controls, by way of a direct-current amplifier 31, a mixing stage 32, which has also supplied to it the pulses from tapping point 16 on the delay line 13. The mixing stage 32 is so biased that pulses from tapping point 16 are transmitted only if the output voltage of difference producer 30 has a positive polarity. Consequently, pulses do not occur in the output circuit of mixing stage 32 if the difference voltage has a negative polarity. The output of mixing stage 32 is connected to the input circuit of a pulse generator 33, which, whenever a pulse is supplied to it, supplies a wider pulse and subsequently returns to its initial position of equilibrium (flip-flop circuit). The widened pulses are supplied through a line 34 to a return circuit including a pulse amplifier 35 and an integrating network 36. The output voltage of the integrating network and the signal to be transmitted supplied from amplifier 29, are supplied to the difference producer 30. The latter supplies an output voltage of negative polarity if the instantaneous value of the output voltage of the integrating network 36 exceeds the instantaneous value of the signal voltage. If the instantaneous value of the signal voltage exceeds the instantaneous value of the output voltage of the integrating network, the difference producer 30 supplies an output voltage of positive polarity, in which case a pulse originating from the delay line is transmitted by mixing stage 32 to the pulse widener 33, the output pulse of which raised the output voltage of the integrating network 36 by a determined quantum. If the increase in output voltage of the integrating network is not sufficient to cause the polarity of the output voltage of the difference producer to become negative, then upon a subsequent incoming pulse from delay line 13 the output voltage of the integrating network 36 will again increase to a value substantially equal to that of the signal voltage supplied to difference producer 30. This results in the output voltage of integrating network 36 substantially following the signal voltage of amplifier 29, the pulses originating from the pulse widener 33 thus characterizing the signal voltage.

The pulses provided by pulse widener 33 are supplied not only to the return circuit 34, 35, 36 but also to a differentiating network 37, which supplies a positive output pulse upon occurrence of the front flank of the widened pulses. The output pulses of differentiating network 37 control a class B amplifier 38, the output circuit of which is connected to the conductor 23, common to all channels.

It will be evident from the foregoing that pulses originating from tapping point 16 on the delay line 13 are transmitted or suppressed in channel $A_3$ as a function of the signal to be transmitted in this channel. With suitable choice of the retardation time of the delay line 13 between its inlet and tapping point 16, the transmitted pulses occur during the interval 3 associated with channel $A_3$. Similarly, the signal pulses originating from the other signal channels occur during the intervals of the cycles corresponding to the channels concerned.

The pulses originating from the synchronisation channel $A_0$ occur continuously and such is not the case with the signal pulses from the signal channels $A_1$ to $A_9$. If the signal pulses in one of the signal channels occur continuously in the outlet circuit, this indicates a defect of the channel concerned and this channel thus requires to be made inoperative. The means required therefor, are indicated in channel $A_3$. If pulse widener 33 continuously supplies pulses, for example in consecutive signal cycles for 0.5 to 1 sec., the output voltage of the integrating network 36 will increase to an abnormally high value. Such a continuous occurrence of widened pulses cannot be due to the signals to be transmitted and consequently, the difference producer 30 will also supply an abnormally high output voltage, i. e., a negative output voltage. The signal from the difference producer 30 may be used to energize a test relay 41 by way of a rectifier 39 and a smoothing filter 40 having a time-constant of, for example, 1 sec., which test relay, upon being energized, opens a contact 42, thus interrupting the connection between differentiating network 37 and pulse amplifier 38. The transmission of further consecutive signal pulses through channel $A_3$ is thus avoided. At the same time upon energisation of test relay 41, an alarm circuit comprising a battery 44 and a pilot lamp 45 is operated owing to closure of contact 43. If desired test relay 41 may be provided with a holding circuit. After response of test relay 41, the equipment of channel $A_3$ may be replaced by spare channel equipment and the defect thereby eliminated.

The voltage for energizing test relay 41, may, as an alternative, be derived from the output voltage of other parts of the circuit, such as the amplifier 38 or the integrating network 36.

It will be evident that the invention is also applicable to the transmission of signals by pulse-code modulation in other manner, for example the pulse modulator indicated in channel $A_3$ in Fig. 2 may be such that, instead of characterizing the differential voltage with the use of a one-unit code, it is characterized by a multi-unit code, for example a three-units code. In such a case, a test device as shown in Fig. 2 will, as a rule, be sufficient, it being unnecessary for the three signal intervals then associated with the channel concerned to be supervised individually.

What we claim is:

1. A transmitter for emitting pulse-code modulation signals in time-multiplex comprising a synchronizing pulse generator for producing synchronizing pulses having a given shape and size, a plurality of signal channels each producing a signal pulse which may be present or absent as a function of the channel signal to be transmitted, all of said signal pulses having said given shape and size, and means to emit cyclically at a predetermined rate a synchronizing pulse from said generator and a signal pulse from each of said channels, each cycle being constituted by a sequence of intervals during one of which the synchronizing pulse is emitted and during the remainder of which the present or absent signal pulses from the respective channels are emitted, said emitted pulses being substantially equal and coinciding in time position with respective pulses of a series of equdistant pulses, each of said signal channels including a test relay, means to energize said relay when signal pulses produced by this channel are continuous rather than present or absent as a function of the signal, and means responsive to the energization of said relay to block the output of the related channel.

2. A transmitter, as set forth in claim 1, further including an alarm circuit coupled to said test relay and responsive to the energization of said relay.

3. A transmitter for emitting pulse-code modulation signals in time-multiplex comprising a synchronizing pulse generator, a plurality of signal channels each producing a signal pulse which may be present or absent as a function of the channel signal to be transmitted, and means to emit cyclically at a predetermined rate a synchronizing pulse from said generator and a signal pulse from each of said channels, each cycle being constituted by a sequence of intervals during one of which the synchronizing pulse is emitted and during the remainder of which the present or absent signal pulses from the respective channels are emitted, said emitted pulses being substantially equal and coinciding in time position with respective pulses of a series of equidistant pulses, each channel comprising a difference producer having first and second input circuits, means to apply the signal to be transmitted to one of said input circuits, a pulse mixer coupled to said difference producer to compare a pulse having a predetermined delay relative to pulses produced by said synchronization pulse generator with the output of said difference producer, a pulse widener coupled to the output of said mixer, a return circuit including an integrating network coupled between the output of said widener and the other input circuit of said difference producer, and an output circuit including a differentiating network coupled to the output of said pulse widener.

4. A transmitter, as set forth in claim 3, further including a test relay circuit having a switch interposed in said output circuit, said relay being energized when signal pulses produced by the related channel are continuous, and being adapted upon energization to disconnect said output circuit.

5. A transmitter, as set forth in claim 4, wherein said relay has a energization coil coupled to the output of said difference producer.

References Cited in the file of this patent

UNITED STATES PATENTS

| | | |
|---|---|---|
| 2,066,522 | Doherty | Jan. 5, 1937 |
| 2,287,862 | Brian | June 30, 1942 |
| 2,489,302 | Levy | Nov. 29, 1949 |
| 2,543,737 | Houghton | Feb. 27, 1951 |
| 2,570,221 | Earp et al. | Oct. 9, 1951 |